US006223187B1

(12) United States Patent
Boothby et al.

(10) Patent No.: US 6,223,187 B1
(45) Date of Patent: Apr. 24, 2001

(54) DISTRIBUTED SYNCHRONIZATION OF DATABASES

(75) Inventors: David J. Boothby; Robert C. Daley, both of Nashua, NH (US)

(73) Assignee: Puma Technology, Inc., San Jose, CA (US)

( * ) Notice: Subject to any disclaimer, the term of this patent is extended or adjusted under 35 U.S.C. 154(b) by 0 days.

(21) Appl. No.: 09/449,644

(22) Filed: Nov. 30, 1999

Related U.S. Application Data

(62) Division of application No. 08/927,922, filed on Sep. 11, 1997, now Pat. No. 6,044,381.

(51) Int. Cl.[7] .................................................. G06F 17/30
(52) U.S. Cl. ......................... 707/201; 707/10; 709/201; 709/248
(58) Field of Search ............................ 707/3, 4, 10, 201, 707/202, 203; 709/203, 219, 217, 248, 201

(56) References Cited

U.S. PATENT DOCUMENTS

| 4,432,057 | 2/1984 | Daniell et al. ....................... 395/608 |
| 4,807,182 | 2/1989 | Queen ................................... 395/144 |
| 4,819,156 | 4/1989 | DeLorme et al. .............. 395/182.13 |

(List continued on next page.)

OTHER PUBLICATIONS

Alfieri, "The Best of WordPerfect Version 5.0," Hayden Books, pp. 153–165, 429–435 (1988).
"Automatically Synchronized Objects," Research Disclosure #29261, p. 614 (Aug. 1988).
Chapura, Inc., 3 Compare, http://www.champura.com/3compare.html (1997), pp. 1–2.
Chapura, Inc., PilotMirror Features Page, http://www.chapura.com/features.html (1997), pp. 1–4.
Cobb et al., "Paradox 3.5 Handbook 3rd Edition," Bantam, pp. 803–816 (1991).
FRx Extends Reporting Power of Platinum Series: (IBM Desktop Software's Line of Accounting Software), Doug Dayton, PC Week, v. 8, n. 5, p. 29(2) (Feb. 4, 1991).
IntelliLink Brochure (1990).
"Logical Connectivity: Applications, Requirements, Architecture, and Research Agenda," Stuart Madnick & Y. Richard Wang, MIT, Systems Sciences, 1991 Hawaii Int'l, vol. 1, IEEE (Jun. 1991).
"Open Network Computing—Technical Overview," Sun Technical Report, Microsystems, Inc., pp. 1–32 (1987).
Organizer Link II Operation Manual, Sharp Electronics Corporation, pp. 1–104.
"The Big Picture (Accessing Information on Remote Data Management System," UNIX Review, v. 7, n. 8, p. 38(7) (Aug. 1989).

(List continued on next page.)

Primary Examiner—Jean R. Homere
(74) Attorney, Agent, or Firm—Fish & Richardson P.C.

(57) ABSTRACT

A computer implemented method is provided for synchronizing a first database located on a first computer and a second database located on a second computer. At the first computer, it is determined whether a record of the first database has been changed or added since a previous synchronization, using a first history file located on the first computer comprising records representative of records of the first database at the completion of the previous synchronization. If the record of the first database has not been changed or added since the previous synchronization, the first computer sends the second computer information which the second computer uses to identify the record of the first database to be unchanged.

4 Claims, 8 Drawing Sheets

Microfiche Appendix Included
(2 Microfiche, 153 Pages)

U.S. PATENT DOCUMENTS

| | | | |
|---|---|---|---|
| 4,827,423 | 5/1989 | Beasley et al. | 364/468 |
| 4,866,611 | 9/1989 | Cree et al. | 395/600 |
| 4,875,159 | 10/1989 | Cary et al. | 395/619 |
| 4,956,809 | 9/1990 | George et al. | 395/601 |
| 4,980,844 | 12/1990 | Demjanenko et al. | 364/550 |
| 5,065,360 | 11/1991 | Kelly | 395/800 |
| 5,136,707 | 8/1992 | Block et al. | 395/600 |
| 5,142,619 | 8/1992 | Webster, III | 395/161 |
| 5,155,850 | 10/1992 | Janis et al. | 395/600 |
| 5,170,480 * | 12/1992 | Mohan et al. | 711/115 |
| 5,187,787 | 2/1993 | Skeen et al. | 395/600 |
| 5,210,868 | 5/1993 | Shimada et al. | 395/615 |
| 5,228,116 | 7/1993 | Harris et al. | 395/54 |
| 5,237,678 | 8/1993 | Kuechler et al. | 395/600 |
| 5,251,151 | 10/1993 | Demjaneko et al. | 364/550 |
| 5,251,291 | 10/1993 | Malcolm | 395/161 |
| 5,261,045 | 11/1993 | Scully et al. | 395/161 |
| 5,261,094 | 11/1993 | Everson et al. | 395/617 |
| 5,272,628 | 12/1993 | Koss | 364/419.19 |
| 5,278,978 | 1/1994 | Demers et al. | 395/600 |
| 5,278,982 | 1/1994 | Daniels et al. | 395/600 |
| 5,283,887 | 2/1994 | Zachery | 395/500 |
| 5,293,627 | 3/1994 | Kato et al. | 395/550 |
| 5,301,313 | 4/1994 | Terada et al. | 395/600 |
| 5,315,709 | 5/1994 | Alston, Jr. et al. | 395/606 |
| 5,327,555 | 7/1994 | Anderson | 395/617 |
| 5,333,252 | 7/1994 | Brewer, III et al. | 395/767 |
| 5,333,265 | 7/1994 | Orimo et al. | 395/200 |
| 5,333,316 | 7/1994 | Champagne et al. | 395/600 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,375,234 | 12/1994 | Davidson et al. | 395/600 |
| 5,392,390 | 2/1995 | Crozier | 395/335 |
| 5,396,612 | 3/1995 | Huh et al. | 395/575 |
| 5,434,994 | 7/1995 | Shaheen et al. | 395/617 |
| 5,444,851 | 8/1995 | Woest | 395/200.1 |
| 5,463,735 | 10/1995 | Pascucci et al. | 395/200.1 |
| 5,475,833 | 12/1995 | Dauerer et al. | 395/617 |
| 5,511,188 | 4/1996 | Pascucci et al. | 395/600 |
| 5,519,606 | 5/1996 | Frid-Nielsen et al. | 395/228 |
| 5,530,939 * | 6/1996 | Mansfield, Jr. et al. | 707/201 |
| 5,560,005 | 9/1996 | Hoover et al. | 395/600 |
| 5,568,402 | 10/1996 | Gray et al. | 364/514 C |
| 5,583,793 | 12/1996 | Gray et al. | 364/514 C |
| 5,600,834 | 2/1997 | Howard | 395/617 |
| 5,613,113 | 3/1997 | Goldring | 395/618 |
| 5,615,364 | 3/1997 | Marks | 395/618 |
| 5,619,689 | 4/1997 | Kelly | 395/617 |
| 5,630,081 | 5/1997 | Rybicki et al. | 395/948 |
| 5,666,530 | 9/1997 | Clark et al. | 395/617 |
| 5,666,553 | 9/1997 | Crozier | 395/803 |
| 5,682,524 | 10/1997 | Freund et al. | 395/605 |
| 5,684,984 | 11/1997 | Jones et al. | 395/610 |
| 5,684,990 | 11/1997 | Boothby | 395/619 |
| 5,701,423 | 12/1997 | Crozier | 395/335 |
| 5,708,812 | 1/1998 | Van Dyke et al. | 395/712 |
| 5,708,840 | 1/1998 | Kikinis et al. | 395/800 |
| 5,710,922 | 1/1998 | Alley et al. | 395/617 |
| 5,727,202 | 3/1998 | Kucala | 395/610 |
| 5,729,735 | 3/1998 | Meyering | 395/610 |
| 5,745,712 | 4/1998 | Tuprin et al. | 395/333 |
| 5,758,150 | 5/1998 | Bell et al. | 395/610 |
| 5,758,355 * | 5/1998 | Buchanan | 707/201 |
| 5,778,388 | 7/1998 | Kawamura et al. | 707/203 |
| 5,790,789 | 8/1998 | Suarez | 395/200.32 |
| 5,809,494 * | 9/1998 | Nguyen | 707/1 |
| 5,832,489 * | 11/1998 | Kucala | 707/10 |
| 5,845,293 | 12/1998 | Veghte et al. | 707/202 |
| 5,870,759 | 2/1999 | Bauer et al. | 707/201 |
| 5,870,765 | 2/1999 | Bauer et al. | 707/203 |
| 5,884,323 * | 3/1999 | Hawkins et al. | 707/201 |
| 5,884,324 | 3/1999 | Cheng et al. | 707/201 |
| 5,884,325 | 3/1999 | Bauer et al. | 707/201 |
| 5,897,640 | 4/1999 | Veghte et al. | 707/202 |
| 5,926,824 | 7/1999 | Hashimoto et al. | 707/520 |
| 5,943,676 | 8/1999 | Boothby | 707/201 |
| 5,978,813 | 11/1999 | Foltz et al. | 707/201 |
| 6,018,303 * | 1/2000 | Sadeh | 341/51 |
| 6,125,369 * | 9/2000 | Wu et al. | 707/201 |

OTHER PUBLICATIONS

User Manual for Connectivity Pack for the HP 95LX, Hewlett Packard Company (1991), pp. 1–82.

User Manual for PC–Link for the B.O.S.S. and the PC–Link for the B.O.S.S., Traveling Software, Inc. (1989), pp. 1–82.

Zahn et al., Network Computing Architecture, pp. 1–11; 19–31; 87–115; 117–133; 187–199; 201–209 (1990).

* cited by examiner

401. INSTRUCT the synchronizer to initialize itself, specifying current user options
402. INSTRUCT the synchronizer to load the appropriate history file into its workspace
403. INSTRUCT host Translator to LOAD all of host Records from host Database
404. INSTRUCT RemoteTranslator to LOAD all of Remote Records from Remote Database --
405. INSTRUCT Synchronizer to perform (CAAR) on all the history, B records, and A records in the workspace.
406. INFORM user exactly what changes are about to be made
407. If user inputs NO, THEN ABORT
408. INSTRUCT host Translator to UNLOAD all applicable changes to host Database.
409. INSTRUCT Remote Translator to UNLOAD all applicable changes to Remote Database.
410. INSTRUCT Synchronizer to CREATE a new history file.

FIG. 4

```
501.   INITIALIZE an empty remote workspace
502.   IF there is a remote history file matching the host history file name
503.           IF the remote history file time stamp matches the history file time stamp
504.                   LOAD the remote history file into the remote workspace
505.           ELSE
506.                   REMOVE the non-matching history file
507.                   Proceed with the empty workspace, all records passed to host
508.           ENDIF
509.   ELSE
510.           Proceed with the empty workspace, all records passed to host
511.   ENDIF
512.   FOR each record in the remote database
513.           Translate and load data field values and unique ID into remote workspace
514.           Compute a hash value to represent all translated data values
515.           IF the unique ID matches the unique ID of an existing remote history file entry,
516.                   IF the hash value is the same
517.                           Skip this entry, the host will recreate this record from history
518.                   ELSE
519.                           Send Unique ID, field values and "Changed" record flag to the host
520.                           Create new workspace entry with same unique ID and new hash value
521.                           This new entry is marked as "unacknowledged"
522.                   ENDIF
523.           ELSE
524.                   Send Unique ID, field values and "Added" record flag to the host
525.                   Create new workspace entry with new unique ID and new hash value
526.                   This new entry is marked as "unacknowledged"
527.           ENDIF
528.   NEXT
529.   FOR each unique ID in the remote history file not matched in the above loop,
530.           Send Unique ID and "Deleted" flag to the host
531.   NEXT
532.   WAIT for host to synchronize the data and for user to confirm results
533.   IF user has aborted the synchronization
534.           The remote workspace is discarded.
535.           The original remote history file remains unmodified.
536.           The process is terminated.
537.   ENDIF
538.   FOR each record "action" or "acknowledgment" received from the host,
539.           IF this is an acknowledgment of a record Added or Updated in the remote database,
540.                   Mark any corresponding, newly created workspace item as "acknowledged"
541.                   Remove any prior workspace item with the same unique ID
542.           ELSE IF this is a new action to Add, Update, or Delete a remote database record
543.                   UPDATE remote workspace to reflect the appropriate change
544.                   Mark any corresponding, newly created workspace item as "acknowledged"
545.                   Remove any prior workspace item with the same unique ID
546.                   IF this is an Add
547.                           SEND the new unique ID back to the host to include in history file
548.                   ENDIF
549.           ENDIF
550.   NEXT
551.   REMOVE any newly create, but "unacknowledged" entries from the workspace
552.   UPDATE the remote history file from the remote workspace
```

FIG. 5

Recreation of "filtered" data by the synchronizer using history data when unique ID's are present.

601. FOR all Added, Changed, and Deleted records transmitted from the remote,
602.     IF record was flagged "Added"
603.         Add the new record to the workspace, not correlated with any history at this time
604.     ELSE IF record has been changed
605.         Find corresponding history item in the workspace by the changed record's Unique ID
606.         Associate (link) the changed record with this workspace item
607.     ELSE IF record has been deleted
608.         Find corresponding history item in the workspace by the deleted record's Unique ID
609.         Associate (link) the delete action with this workspace item
610.     ENDIF
611. NEXT
612. FOR all history records not yet matched by a remote Unique ID,
613.     CLONE the missing record data and Unique ID from data in the history file
614. NEXT Updating the remote computer's remote history file while unloading changes from the workspace to the remote database (when unique ID's are used):

615. FOR all actions or acknowledgments recorded in the workspace for the remote database
616.     SEND all actions with associated record data to the remote
617.     SEND all acknowledgments to the remote with associated unique ID's
618.     UPDATE workspace with unique ID's sent from the remote as the result "Add" actions.
619. NEXT

FIG. 6

701. INITIALIZE an empty remote workspace
702. IF there is a remote history file matching the host history file name
703.     IF the remote history file time stamp matches the history file time stamp
704.         LOAD the remote history file into the remote workspace
705.     ELSE
706.         REMOVE the non-matching history file
707.         Proceed with the empty workspace, all records passed to host
708.     ENDIF
709. ELSE
710.     Proceed with the empty workspace, all records passed to host
711. ENDIF
712. FOR each record in the remote database,
713.     Translate and load data field values into the remote workspace
714.     Compute a hash value to represent all translated data values
715.     IF the hash value matches the hash value of one or more remote history file entries,
716.         Send hash value, remote workspace index, and "Unchanged" record flag to the host
717.     ELSE
718.         Create new workspace entry with new new hash value and remote workspace index
719.         This new entry is marked as "unacknowledged"
720.         Send hash value, remote workspace index, field values and "Added" record flag to the host
721.     ENDIF
722. NEXT
723. REMOVE any "prior" workspace entries not matched by hash value above
724. WAIT for host to synchronize the data and for user to confirm results
725. IF user has aborted the synchronization
726.     The remote workspace is discarded.
727.     The original remote history file remains unmodified.
728.     The process is terminated.
729. ENDIF
730. FOR each record "action" or "acknowledgment" received from the host,
731.     IF this is an acknowledgment of a record sent to the host (above) as "added",
732.         Mark any corresponding, newly created workspace item as "acknowledged"
733.     ELSE IF this is a new action to Add, Update, or Delete a remote database record
734.         UPDATE remote workspace to reflect the appropriate change
735.         Mark the updated record as "acknowledged"
736.     ENDIF
737. NEXT
738. REMOVE any newly create, but "unacknowledged" entries from the workspace
     UPDATE the remote history file from the remote workspace

FIG. 7

Recreation of "filtered" data by the synchronizer using history data when unique ID's are <u>not</u> present.

801.  FOR all Added records transmitted from the remote ,
802.    Add the new record to the workspace, not correlated with any history at this time
803.  NEXT
804.  FOR all Unchanged items transmitted from the remote ,
805.    Find corresponding history item in the workspace by the unchanged record's hash value
806.    CLONE the missing record data from data in the history file
807.  NEXT Updating the remote computer's remote history file while unloading changes from the workspace to the remote database (when unique ID's are not used):

808.  FOR all actions or acknowledgments recorded in the workspace for the remote database
809.    SEND all actions with associated record data to the remote
810.    SEND all acknowledgments to the remote with associated remote workspace indexes
811.  NEXT

FIG. 8

DISTRIBUTED SYNCHRONIZATION OF DATABASES

CROSS REFERENCE TO RELATED APPLICATION

This application is a divisional of U.S. application Ser. No. 08/927,922, filed Sep. 11, 1997, now U.S. Pat. No. 6,044,381.

REFERENCE TO MICROFICHE APPENDIX

An appendix (appearing now in paper format to be replaced later in microfiche format) forms part of this application. The appendix, which includes a source code listing relating to an embodiment of the invention, includes 153 frames on 2 microfiche.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

BACKGROUND

This invention relates to synchronizing databases.

Databases are collections of data entries which are organized, stored, and manipulated in a manner specified by applications known as database managers (hereinafter also referred to as "Applications"; the term "database" will also refer to the combination of a database manager and a database proper). The manner in which database entries are organized in a database is known as its data structure.

There are generally two types of database managers. First are general purpose database managers in which the user determines (usually at the outset, but subject to future revisions) what the data structure is. These Applications often have their own programming language and provide great flexibility to the user. Second are special purpose database managers that are specifically designed to create and manage a database having a preset data structure. Examples of these special purpose database managers are various scheduling, diary, and contact manager Applications for desktop and handheld computers. Database managers organize the information in a database into records, with each record made up of fields. Fields and records of a database may have many different characteristics depending on the database manager's purpose and utility.

Databases can be said to be incompatible with one another when the data structure of one is not the same as the data structure of another, even though some of the content of the records is substantially the same. For example, one database may store names and addresses in the following fields: FIRST_NAME, LAST_NAME, and ADDRESS. Another database may, however, store the same information with the following structure: NAME, STREET_NO., STREET_NAME, CITY_STATE, and ZIP. Although the content of the records is intended to contain the same kind of information, the organization of that information is completely different.

Often users of incompatible databases want to be able to synchronize them with one another. For example, in the context of scheduling and contact manager Applications, a person might use one Application on the desktop computer at work while another on his handheld computer or his laptop computer while away from work. It is desirable for many of these users to be able to synchronize the entries on one with entries on another. The U.S. patent and copending patent application of the assignee hereof, Puma Technology, Inc. of St. Jose, Calif. (U.S. Pat. No. 5,392,390 (hereinafter, "the '390 patent"); U.S. application, Ser. No. 08/371,194, filed on Jan. 11, 1995, incorporated by reference herein) show two methods for synchronizing incompatible databases and solving some of the problems arising from incompatibility of databases.

Synchronization of two incompatible databases often requires comparison of their records so that they can be matched up prior to synchronization. This may require transferring records in one database from one computer to another. However, if the data transfer link between the two computers is slow, as for example is the case with current infrared ports, telephone modem, or small handheld computers, such a transfer increases the required time for synchronization by many folds.

SUMMARY

In one aspect, the invention features a computer implemented method for synchronizing a first database located on a first computer and a second database located on a second computer. At the first computer, it is determined whether a record of the first database has been changed or added since a previous synchronization, using a first history file located on the first computer comprising records representative of records of the first database at the completion of the previous synchronization. If the record of the first database has not been changed or added since the previous synchronization, the first computer sends the second computer information which the second computer uses to identify the record of the first database to be unchanged.

The embodiments of this aspect of the invention may include one or more of the following features.

A second history file may be located on the second computer. The second history file contains records representative of records of the first database at the completion of the previous synchronization, where one of the representative records represents the record of the first database determined to be unchanged. Then, at the second computer, a synchronization of the second and first databases is performed using the one of the representative records.

The information sent from the first computer to the second computer can be used to locate the one of the representative records in the second history file. The second history file can store information in relation to the representative records and the one of the representative records in the second history file can be identified from that stored information. Additionally, the information sent from the first computer to the second computer can include information that matches the information stored in relation to the one of the representative records in the second history files.

The information sent to the second computer can include information identifying records other than the unchanged record. It can also include information identifying the changed record. It can also include information identifying the deleted records or added records. The information can also include a code based on at least a portion of the content of the record of the first database. The code may be a hash number. The information may be a code uniquely identifying the record of the first database. Such a code may be one assigned by the first database to the records.

In another aspect, the invention features a computer implemented method of identifying a record of a database. A record of the database is read. A code is assigned to the record of the database, the code being based on at least a portion of the content of the record of the first database. The code is then to identify the record at a later time.

The embodiments of this aspect of the invention may include one or more of the following features.

The code may be a hash number computed based on at least a portion of the content of a record of the first database.

The database is stored on a first computer and the code is transmitted. to a second computer to identify the record to an application.

Advantages of the invention may include one or more of the following advantages.

When synchronization is performed using the invention, a data transfer link, specially a slow data transfer link, is used efficiently, since unchanged records that are typically the majority of the records in a database are not transferred between the two computers. Hence, when synchronizing two databases on two different computers, the time needed to synchronize the two databases is decreased Also, when transmitting data from one computer to another, using a content based code, that requires less bandwidth for being transmitted and nonetheless identifies a record, results in a slow data transfer links being used more efficiently.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of various embodiments, including the drawings, and from the claims.

BRIEF DESCRIPTION OF THE DRAWING

FIG. 4 is pseudocode for the Translation Engine Control Module.

FIG. 5 is pseudocode for a remote segment of a synchronization program when loading records from and unloading records to the remote database, when the database assigns unique IDs.

FIG. 6 is pseudocode for a host segment of a synchronization program when loading records from and unloading records to the remote database, when the database assigns unique IDs.

FIG. 7 is pseudocode for a remote segment of a synchronization program when loading records from and unloading records to the remote database, when the database does not assign unique IDs.

FIG. 8 is pseudocode for a host segment of a synchronization program when loading records from and unloading records to the remote database, when the database assigns unique Ids.

DESCRIPTION

Figure 1:
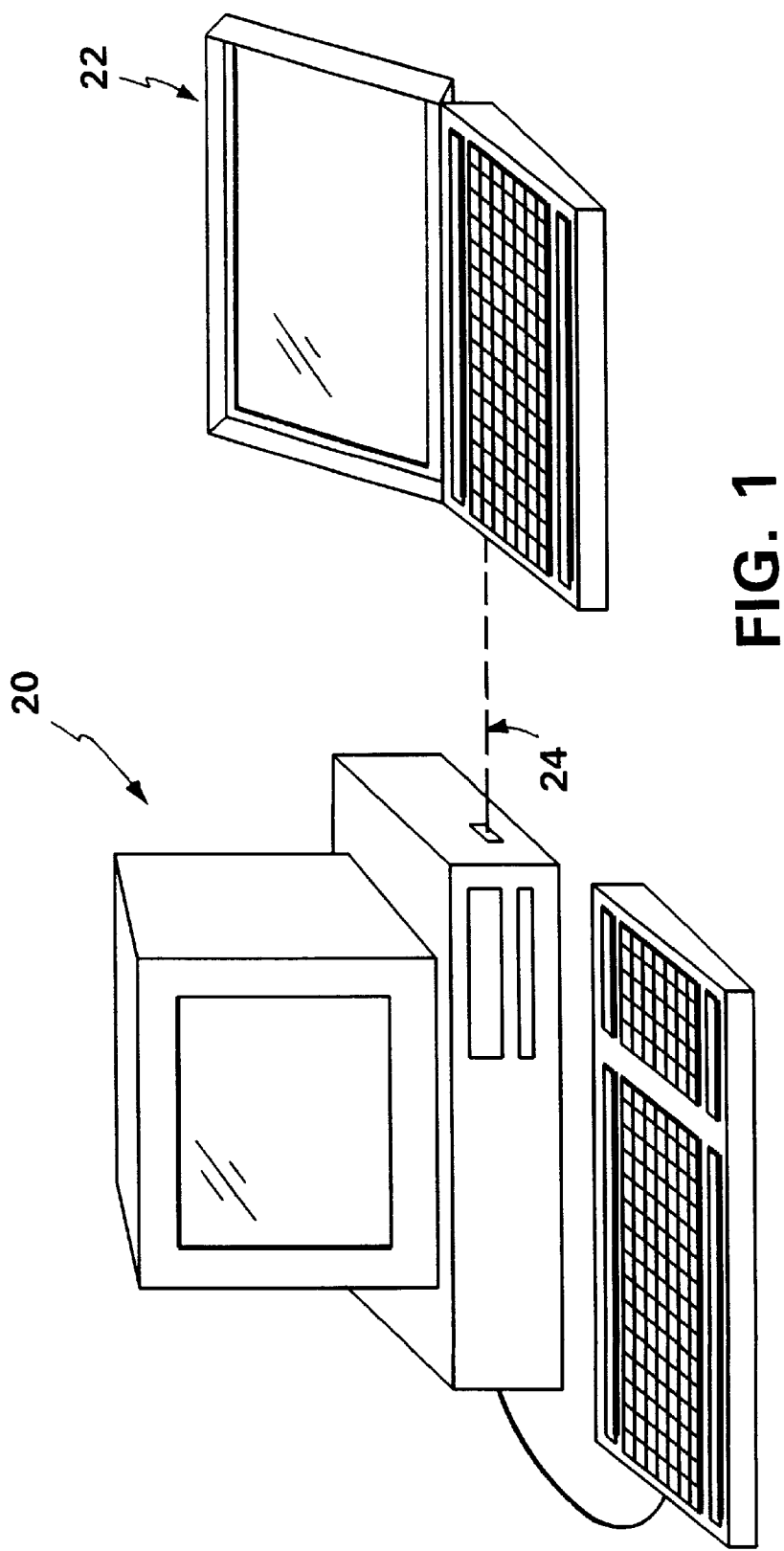
FIG. 1 shows two computers connected via data transfer link.
Figure 2:
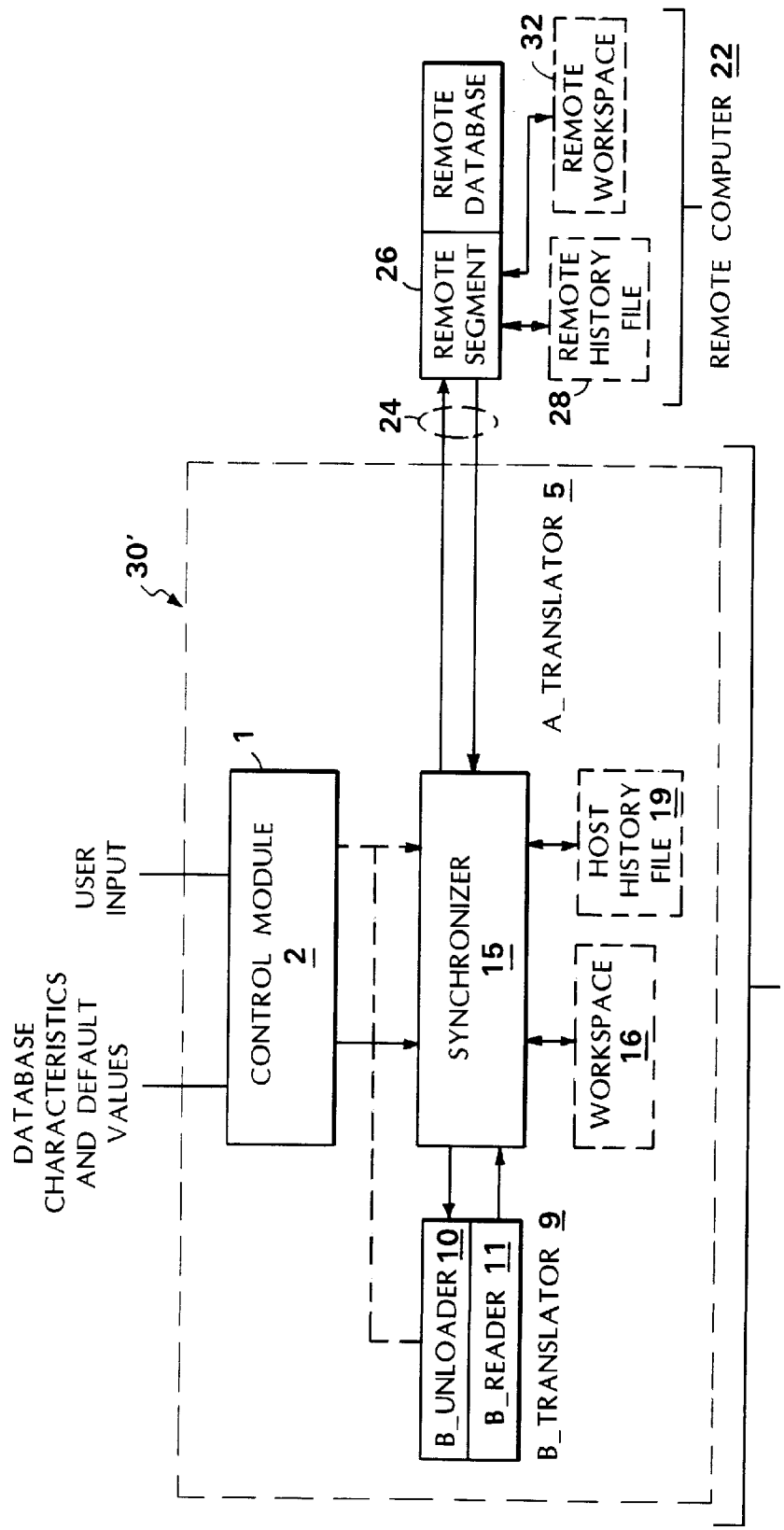
FIG. 2 is a schematic drawing of the various modules constituting an embodiment.

Briefly, referring to FIGS. 1 and 2, a synchronization program, according to the embodiments described here, has a host segment 28 and a remote segment 26 which run on a host computer 20 and a remote computer 22, respectively. The two computer are connected together via a data transfer link 24 enabling them to transfer data between them. Data transfer link 24 may be a slow data transfer link such as a serial infrared links, serial cables, modems and telephone lines, or other such data transfer links. A host database 13 and a remote database 14, e.g. scheduling databases, are stored on remote computer 22 and host computer 20, respectively.

Generally, in some instances, both computers on which the two databases run are capable of running programs other than a database, as in the case of, for example, general purpose computers such as desktop and notebook computers, or handheld computers having sufficient memory and processing power. In such a case, the synchronization program may be distributed between the two computers so as to, for example, increase the efficiency of using of a slow data transfer link between the two machines.

Briefly, at remote computer 22, remote segment 26 of the synchronization program loads records of remote database 13. Remote segment 26 then determines which records of the remote database have been changed/added, deleted or left unchanged since a previous synchronization. If the remote database assigns unique identification codes (i.e. unique ID) to its records, remote segment 26 can further differentiate between records than have been added and those than have been changed since the previous synchronization. Remote segment 26 uses a remote history file 30 which stores data representing or reflecting the records of the database at the completion of the previous synchronization. This data may be a copy of remote database 13. It may also be hash numbers for each of the records of the remote database. If the remote database assigns unique IDs, the remote history file may contain those unique IDs together with the hash numbers of the records corresponding to the stored unique IDs.

Remote segment 26 sends those records of the remote database that have been changed or added to the host segment or the host computer. However, the remote segment does not send the unchanged or deleted records to the host computer. Instead, the remote segment sends a flag indicating the status of the record (e.g. unchanged or changed) and some data or information that uniquely identifies the record to the host segment. This data or information may be a hash number of all or selected fields in the record at the completion of the last synchronization. It may also be the unique ID assigned to the record by the remote database, if the database assigns one to its records.

Host segment 28 uses the received information or data that uniquely identifies the unchanged record to access a record in host history file 19 that corresponds to the received information or data. This record contains a copy of the data of the remote database record that the remote segment found to have been unchanged. Host segment 19 then uses this record to synchronize the databases by comparing it to the records of host database 14. After synchronization, the remote and host history files and the databases are updated. Since the unchanged records which typically constitute most of the records of a database are not transferred to the host computer, a data transfer link, specially a slow data transfer link, is used with increased efficiency.

Figure 3:
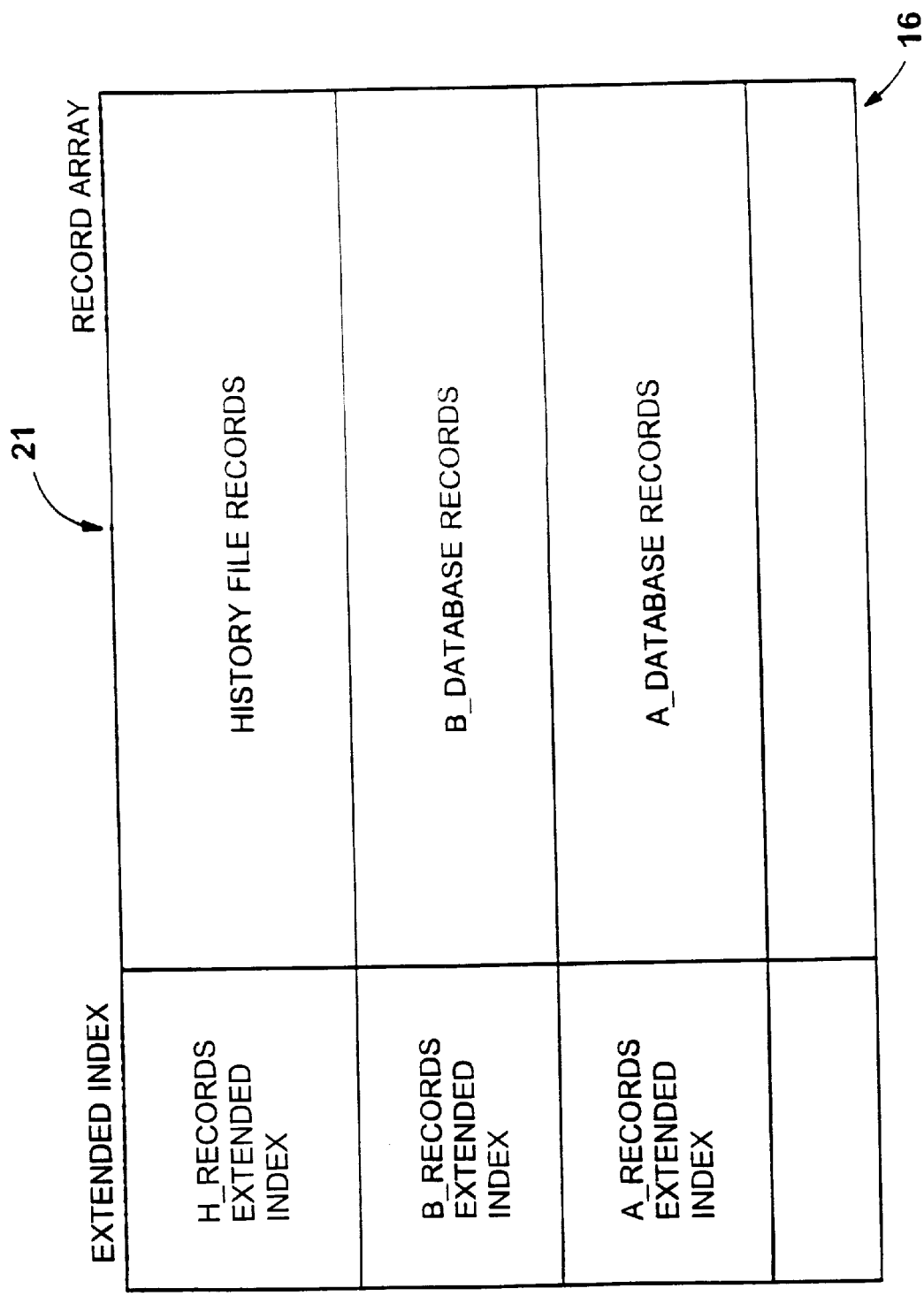
FIG. 3 is a representation of the host workspace data array.

We will describe two embodiments of a distributed synchronization program. We will first describe in general terms the overall structure of the distributed synchronization program in reference to FIGS. 2 and 3 which is common to both embodiments. We will then describe then the first and second embodiments performing a distributed synchronization in reference to FIGS. 4–8.

FIG. 2 shows the relationship between the various modules of an embodiment of a distributed synchronization program. Translation Engine 1 comprises a Control Module 2 that is responsible for controlling the synchronizing process by instructing various modules to perform specific tasks on the records of the two databases being synchronized. The Control Module 2 also provides data that affects the specific operation of the various components of the synchronization program, such as the name of the databases being synchronized and user preferences. FIG. 4 is the pseudocode of the steps taken by this module. The Synchronizer 15 has primary responsibility for carrying out the core synchronizing functions. It is a table-driven code which is capable of synchronizing various types of databases whose characteristics are provided by control module 2. The Synchronizer creates and uses a host workspace 16 (shown in detail in FIG. 3), which is a temporary data array used during the synchronization process.

A host translator 9 includes two modules: a reader module 10 which reads the data from the host database 14 and an unloader module 10 which analyzes and unloads records from the host workspace into the host database 14. Remote segment 26 also has similar modules for reading and unloading data from the remote database. The remote segment is designed specifically for interacting with remote database 13. The design of the remote segment is specifically based on the record and field structure of the remote database and remote database's Application Program Interface (API) requirements and limitations and other characteristics of the remote database. Similarly host translator 9 is designed specifically for the host database. The remote segment and host translator are not able to interact with any other databases or Applications. They are only aware of the characteristics of the databases for which they have been designed. In an alternate embodiment, the host translator and the remote segment can be designed as a table-driven code, where a general Translator is able to interact with a variety of databases based on the parameters supplied by, for example, the Control Module 2. It should be noted that the remote segment and host translator may be designed in various ways and still perform the tasks set out in this embodiment.

FIG. 4 is the pseudocode for the operation of Control Module 2 of the Translation Engine 1. We will use this pseudocode to generally describe distributed synchronization according to the invention. Control Module 2 first initializes itself and specifies the current user options to various modules (Step 401). In step 402, control module 2 instructs the Synchronizer to load host history file 19. Synchronizer 15 in response creates host workspace 16 data array and loads host history file 19 into host workspace 16. Host history file 19 is a file that was saved at the end of last synchronization and contains records. representative of the records of the two databases at the end of the previous synchronization. Typically, the host history file contains a copy of the results of the previous synchronization of the synchronized records of the two databases. It should be noted that the content of the records of the history file may be limited only to those fields that are synchronized and the data may be translated and stored in a format different than that of the remote database or the host database. This data can be used to reconstruct the content of the records of the remote database as they were at the end of the previous synchronization. The host history file is generally used to determine changes to the databases since a previous synchronization and also to recreate records not sent from the remote segment, as will be described in detail below. If no history file from a previous synchronization exists or the user chooses to synchronize without using the history file, in step 402 the synchronizer does not load a history file. In that case, all the records from both databases will be loaded into the host workspace. We will describe the rest of the operation of the control module as if a history file exists and will be used.

Once the History File is loaded into the host workspace, Control Module 2 instructs host translator 13 to load the host database records (step 403). Host Reader module 11 of the host Translator reads the host database records and sends them to the Synchronizer for writing into the host workspace.

Control Module 2 then instructs remote segment to send the records of the remote database (step 404). Remote segment 26 reads the remote database records and sends them to Synchronizer 15 for writing into the host workspace. The actions taken by the synchronizer and the remote segment in response to step 404 will be described in detail in reference to FIGS. 5, 6, 7, and 8, below.

Records in the host workspace are stored according to either the host database or the remote database data structures. Therefore, as synchronizer 15 receives each record, the Synchronizer maps that record using the appropriate record map (i.e. either a remote database to host database record map or a host database to remote database record map) before writing the record into the next available spot in the host workspace. Mapping may be performed by other modules, e.g. the remote segment. The records may also be "translated", i.e. cast into a format which synchronizer can use (a "translation" method is described in the '390 patent). For example, a date stored as "Apr. 1, 1997" may be translated into a format preferred by the synchronizer, e.g. Apr. 1, 1997

Control module 2 then instructs the Synchronizer to perform a Conflict Analysis and Resolution ("CAAR") procedure on the records in the host workspace (step 405), which procedure is described in detail in the following applications of the assignee hereof, Puma Technology, Inc. of St. Jose, Calif. incorporated by reference in their entirety including any appendices: "Synchronization of Recurring Records in Incompatible Databases", Ser. No. 08/752,490, filed on Nov. 13, 1996 (hereinafter, "'490 application"); "Synchronization of Databases with Record Sanitizing and Intelligent Comparison," Ser. No. 08/749,926, filed Nov. 13, 1996 (hereinafter, "'926 application"); "Synchronization of Databases with Date Range," Ser. No. 08/748,645, filed Nov. 13, 1996 (hereinafter, "'645 application"). Generally, synchronization is a process of analyzing records from the remote database and host database against the records of the history file to determine the changes, additions, and deletions in each of the two databases since the previous synchronization and what additions, deletions, or updates need be made to the databases to synchronize the records of the databases. Briefly, during CAAR, the synchronization engine (i.e. the Synchronizer) compares the records in the host workspace and determines what synchronizing actions should be taken. The synchronization engine processes the records, including comparing them to one another, in order to form them into groups of related records. Each of these groups may comprise at most one recurring or a group of related nonrecurring records from each of the databases and history file. After forming these groups from all records of the two databases, the Synchronizer determines what synchronization action should be taken. To do this, the Synchronizer compares them, determines their differences, and decides what synchronization action is appropriate or asks the user what action should be taken. The synchronizer then associates with that record, the specific "action" (e.g. add, update or delete) that must be taken with respect to that record in that record's database. During "CAAR", the user may select not to synchronize a particular record with the other database. We will describe below in detail the steps performed by the synchronizer and the remote segment in response to the output of CAAR as the output relates to the remote database.

Once Synchronizer 15 finishes performing CAAR on the records, the records may be unloaded or written into their respective databases, including any additions, updates, or deletions. However, prior to doing so, the user is asked to confirm proceeding with unloading (steps 108–109). Up to this point, neither the databases nor the History File have been modified. The user may obtain through the Control Module's Graphical User Interface (GUI) various information regarding what will transpire upon unloading.

If the user chooses to proceed with synchronization and to unload, the records are then unloaded in order into the host database, the remote database and the History File. The Synchronizer in conjunction with the host translator and the remote segment perform the unloading for the databases. Synchronizer 15 creates a host history File and unloads the records into it. Control Module 2 first instructs the host translator to unload the records from host workspace into the host database. Following unloading of the host records., Control Module 2 instructs the synchronizer and the remote segment to unload the remote records from the host workspace (step 409). We will describe in detail below, in reference to FIGS. 5–8, the specific actions taken by Synchronizer 15 and remote segment 26 in order to unload data from the host workspace into the remote database and the update remote history file 28. Control Module 2 next instructs the Synchronizer to create a new History File (step 112). At this point Synchronization is complete.

Referring to FIGS. 5–8, we will now describe the actions taken by the remote segment in coordination with the Synchronizer in response to the instructions from control module 2 in step 404 to load records of the remote database and in step 409 to unload the records of the remote database from the host workspace. Specifically, we will describe two embodiments. In the case of the first embodiment, the remote database assigns unique identification codes (i.e. unique IDs) to each of its records as they are created. In the case of the second embodiment, the remote database does not assign unique IDs to its records. FIG. 5 is the pseudocode for the steps taken by the remote segment while FIG. 6 is the pseudocode for the steps taken by the Synchronizer in the case of the second embodiment. Similarly, FIG. 7 is the pseudocode for the steps taken by the remote segment while FIG. 8 is the pseudocode for the steps taken by the Synchronizer in the case of the first embodiment.

Briefly, the remote segment determines which records have been changed/added, deleted or left unchanged since a previous synchronization. The remote segment uses a history file located on the remote computer ("remote history file") to determine which records may have been changed/added, deleted or left unchanged since a previous synchronization. The remote segment essentially can translate outputs of any database into outputs of a fast synchronization database which is a type of database that generally supplies information as to which of its records have been changed, added, deleted, or left unchanged. Fast synchronization databases and an example of a method of synchronizing them with other databases is described in detail in the '490, '926 & '645 applications. Therefore, for example, this method of distributed synchronization may also be implemented with any synchronization program that is able to synchronize such databases.

Generally, the remote segment sends the host segment, over the data transfer link, only the content of those records that have been changed or newly added. As for unchanged records, the history file contains all necessary information to recreate or synchronize those records, if needed. Therefore, it is not necessary to transfer those records to the host segment. Only some data or identification code that uniquely identifies the record to the Synchronizer need be transferred for such a record. Since the majority of records are typically unchanged records, not transferring them over the slow data transfer link improves the efficiency of the synchronization process.

After all necessary information has been transferred to the host segment, the Synchronizer synchronizes the databases. Following synchronization, the host segment transfers information necessary to update the remote database and the remote history file to the remote segment. The remote segment then updates its history file and the remote database.

Since both the host and remote segments rely heavily on history files to enable distributed synchronization, it is important that the host and remote segments use history files that correspond to one another, i.e. both contain records corresponding to a previous synchronization of the same two databases. In the described embodiment, the remote and host history files are named using a common naming convention. The name of a file is made up of six components:

1) Name or ID of the host computer, which may be an assigned name such as an assigned GUID in the case of operating systems by Microsoft Corporation of Redmond, Washington, or UUID in the case of operating systems by Open Software Foundation;

2) Name or ID of the host database application, e.g. trademark designations "Lotus Organizer" or "Microsoft Schedule+";

3) Name or ID of the host database file as stored on the long term storage (e.g. hard disk drive) of the host computer, e.g. "My Calendar";

4) Name or ID of the remote computer;

5) Name or ID of the remote database application; and

6) Name or ID of the remote database. Therefore, the remote segment and the host segment ensure that the host history file have the same name. Moreover, each of the history files have the date and time stamp of the previous synchronization. The remote segment and synchronizer use this to ensure that the history files from the same previous synchronization of the two databases are used.

Having described in general terms the actions taken by the remote segment in coordination with the Synchronizer in response to the instructions from control module 2 in steps 404 and 409 (FIG. 4), we will now describe in detail a first embodiment of their operation for the case where the remote database assigns unique IDs to its records. We will do so in reference to FIGS. 5 and 6.

FIG. 5 is the pseudocode for steps taken by the remote segment in response to the instruction by control module in step 404 to load the remote database records into the host workspace (FIG. 4). The remote segment first initializes (i.e. creates) a remote workspace in the remote computer (step 501). The remote segment then compares the name of the host history file with the name of any remote history file in the remote computer. If the remote segment finds a remote history file that matches the host history file (i.e. a remote history file that matches the host history file) (step 502), then the remote segment examine the date and time stamp of the host and remote history files. If the date and time stamp in the remote history file matches the one in the host history file (step 503), then the remote segment determines that two history files correspond to one another. Hence, the remote segment loads the remote history file into the remote workspace.

In general, if matching history files do not exist on the remote and host computers, the remote segment transfers all remote database records to the host computer. Therefore, if the name of the host and remote history files match but the date and time stamps do not match (step 505), then the remote segment assumes that remote history file is not the correct remote history file to be used. The remote segment removes that history file (step 506) and transfers all remote database records to the host computer (step 507). If no remote history file matches the host history file (step 508), then the remote segment assumes an appropriate remote history file does not exist. The remote segment transfers all the records to the host computer (step 509). To transfer all the records in the above steps, the remote segment first loads and stores all records of the remote database in the remote workspace. The remote segment then transfers all records in the remote database to the host segment. If remote segment transfers all the records of the remote database to the host segment in either step 504 or 509, then the remote will go to step 528. It should be noted that the host segment will use the host history file, if one exists, to perform the synchronization.

If an appropriate remote history file exists—i.e. conditions of steps 501 and 504 are satisfied—the remote history file is loaded into the work space. It is then used to "filter" out information that need not be sent to the host segment since it already exists on the host segment. Generally, the history files on the remote and history files are used to store information representative of the remote database at the end of the previous synchronization. The records of the remote history file in the first embodiment contain the unique ID of the records and hash numbers of those records at the completion of a prior synchronization. In other embodiments, the remote history file may contain some or all of the field values of the records of the remote database.

Hashing may be described as converting any data, such as a string of characters, into a more compacted format, such as a number, meant to represent that string of characters. It may be considered to be a content-based encoding technique. The hashed values may be used as a surrogate for a hashed string of characters, for example, to compare strings. An example of a hashing algorithm is to calculate the following sum for every characters in a character string:

$$\text{sum} = \text{character} + (31 * \text{sum}),$$

where character is the number stored in the memory to represent that character (e.g. an Ascii value). (It should be noted that there are many ways of hashing data.) At the end of the computation, sum contains the hash number for that string of characters. In the described embodiments, the hash number is a 32 bit number and therefore can have a value between $2^{32}$ different values. Because the expected number of records is much less than this number, the probability of two different records having the same hash value is small. Therefore, hash numbers can be used to perform comparisons instead of comparing the non-hashed data or a preliminary check before comparing the data, with relatively low risk inaccurate comparison. We have also use hash numbers as a unique identification code, which will be described in the second embodiment.

The remote segment uses the remote history file to determine whether a record has been changed, deleted, or added since a previous synchronization. Therefore, for records that are unchanged, which typically constitute the majority of records in a database, the remote segment sends information that the host segment can use to identify the matching records in the host history file. That matching history file record contains the same data as necessary to use for synchronization as that on the remote database since the record is unchanged. Therefore, there is no need to send the whole record. In essence, the remote segment uses the remote history file to filter out information that is already contained in the host history file and sending only those records that have been changed or added. In some embodiments, the remote history file may contain all the field values of the records of the remote database. In those embodiments, the remote segment can determine not only which records have been changed but more specifically which field values have been changed. In that case, the remote segment can determine and then send only those field values that have been changed, further increasing the efficiency of using the slow data transfer link.

We will now describe this process in detail. In the described embodiment, for each record of the remote database (step 515), the remote segment loads the field values, including the unique ID, of the record into the remote workspace (step 512). As the records are loaded, they are translated (e.g. "translated" as described in the '390 patent) into a universal format for the remote workspace. The records will be translated back into the format of the remote database as they are written into the remote database. The remote segment also computes a hash number based on all or selected (e.g. the fields to be synchronized) field values (step 513). In the described embodiment, the hashing number is a 32 bit number. The fields on which the hash number is based on remain the same for all synchronizations relying on this remote history file. The host segment also performs a hash on the same fields. If the fields which are hashed changes, the hash number of unchanged records would not remain the same from one synchronization to the next.

If the unique ID matches one of the unique IDs of records in the remote history file (step 515), then the record was present during the previous synchronization. That record could either be a changed record or an unchanged record. If the computed hash number for the record matches the hash number of the record in the history file (step 516), then the remote segment assumes that the record has not been changed since the previous synchronization and therefore can be created by the host segment from the host history file. The remote segment will take no action (step 517). In other embodiments, the remote segment can send the unique ID and a flag indicating that the record is unchanged to the host segment.

If the computed hash number does not match that of the history file record (step 518), the remote segment assumes that the record has been changed since a previous synchronization. Therefore, the remote segment sends the host computer the field values including the unique ID and a "changed" flag (step 519). In some embodiments, only those field values that have been changed since the previous synchronization will be sent, as described above. The remote segment then creates a new entry for the changed record in the history file (step 520) and marks the record as unacknowledged (step 521), the purpose and function of which we will now briefly describe and is also described in the '490, '926 and '645 applications.

Generally, the remote segment does not change an entry in the remote history file, until it receives an instruction indicating that the host segment has synchronized and updated the host database with that record. This is done so that if for any reason (e.g. user does not want to update that record of the host database as described above) the host database is not synchronized with that record, the remote segment will not treat that record as unchanged during the next synchronization. The acknowledgement may take the form of an "acknowledgment" flag or an "action" instruction which instructs the remote segment to add, update, or delete that record of the remote database, as described above. Therefore, for each changed and deleted record, the remote segment creates a new entry and marks the entry as "unacknowledged". If an "acknowledgment" flag is received, the old history file record is deleted. If an "acknowledgement" flag is not received, the new workspace entry is deleted. The steps will be described further below.

If in step 515 the remote segment determines that the unique ID of the loaded record does not match any of the unique IDs stored in the records of the history file (step 521), the remote segment assumes that the record loaded from the remote database has been newly added. Therefore, the remote segment sends the host segment a copy of the field values of those fields of the record to be synchronized (which may be all or less than all the fields) together with an "added" flag (step 524). As in the case of a changed record, the remote segment creates a new remote workspace entry and enters the unique ID and hash value of the record (step 525). The new entry is marked as unacknowledged (step 526).

After all the records have been loaded (step 528), the remote database determines that unique IDs in the history file that have not been matched represent the deleted records (step 529). Therefore, the remote segment sends the host segment those unique IDS together with "delete" flags (step 530).

After the remote segment has finished providing data to the host segment, the host segment synchronizes the two databases based on the input from the remote segment. The remote segment waits until the host segment finishes synchronizing and instructs the remote segment in step 409 in FIG. 4 to begin unloading into the remote database (step 532).

The host segment synchronizes the two database similar in the way it synchronizes a so-called "fast synchronization" database (as defined in the '490, '926, and '645 applications) with another database. The operation of a synchronization program synchronizing a fast synchronization database with either a fast synchronization database or a regular database (i.e. non- fast synchronization) is described in detail in the '490, '926, and '645. We will now describe in detail how the information from the remote segment is used to synchronize the remote database with another database.

As described above, a remote segment sending remote database records to the Synchronizer provides field values of only those records which have been changed or added since the previous synchronization but not those records that are unchanged or deleted. Therefore, unlike a regular database Translator, the remote segment does not provide the Synchronizer with unchanged records.

In order to synchronize the remote database with the host database, the Synchronizer transforms information from the remote segment into regarding unchanged records into equivalent regular database records. These transformed records are then used by the Synchronizer in the synchronization. Essentially, the synchronizer transforms and uses the information sent by the remote segment to identify a record in the history file that is a copy of the field values of the unchanged remote database record. In the described embodiment, the synchronizer also copies that history file record and flags as being the remote database record.

The described embodiment uses the host history file to perform this transformation. At the beginning of a first synchronization between the two databases, all records in the remote database are loaded into the host history file. As changes, additions, and deletions are made to the remote database, during each subsequent synchronization, the same changes, additions, and deletions are made to the host history file. Therefore, the host history file at the end of each synchronization will contain a copy of the relevant content of the remote database after synchronization. By relevant, we mean data in the fields that are synchronized. For example, it may be the case that the host history file contain data in fields that are not synchronized. Moreover, if the records of the remote are mapped or recast into another format (e.g. "translated" as described in the '390 patent) the records of the history file contain a copy of the records of the database, as mapped, translated, or both. The Synchronizer uses the mapped or translated records for synchronization. Therefore, it only needs the mapped or translated copy of the unchanged record. In other embodiments, the host history file may contains copies of all the records exactly as they are in the remote database or in some other format that is useful for the particular application.

Referring to FIG. 6, in the described embodiment, all records received by the host segment from the remote segment are flagged with one of Added, Changed, or Deleted flags. For all records received from the remote segment (step 601), the host synchronizer performs the following functions. If a received record is flagged as an added record (step 602), then the received record is added to the host workspace (step 603). Since the record is new, it is not associated or linked to any history file record. If a record is flagged as a "changed" record (step 604), then the Synchronizer uses the received unique ID to find the corresponding record in the history file (step 605) and links the received remote record to that history file record (step 606). If the received record is flagged as a "deleted" record (step 607), then the Synchronizer uses the received unique ID to find the corresponding record in the history file (step 608)and marks the history file record as deleted (step 609).

After all the received records are analyzed (step 611), if any host history file records containing remote database unique IDs are left that were not matched against the received records, the synchronizer assumes that those records represent the remote database records that are unchanged. For all those records (step 612), the synchronizer clones the host history file record (i.e. create a workspace entry and copy all the host history file record in to that entry) and treats it as a record received from the remote database. At this point the host segment proceeds with synchronization since the records of the remote database have now been loaded. In essence, referring back to FIG. 4, this is the end of step 404.

As previously described, after the synchronizer has performed CAAR, the user must confirm to proceed with updating the remote database (step 406 in FIG. 4). If the user decides to terminate the synchronization, changes are not made to the host history file or the databases. In the case of the remote database, as described in reference to FIG. 5, the remote segment is waiting for the synchronizer to finish synchronizing. If the user aborts synchronization (step 533), the remote segment discards the remote workspace (step 534), saves the original history file without any changes (step 535), and terminates the process at the remote computer.

If the user confirms to proceed with updating the database (step 406 in FIG. 4), control module 2 instructs the synchronizer and the remote segment to proceed with unloading the records from the workspace into the remote database. As stated, at this point, the remote segment is waiting for the synchronizer to finish synchronizing (step 532 in FIG. 5). During the synchronization, the synchronizer has determined what "actions" with respect to which record in which database should be taken (update, delete, or add) to complete synchronization. If changes or additions are made to the host database in the case of particular record but no action need be taken with respect to that record in the remote database, the synchronizer determines that an "acknowledgement" should be sent to the remote segment. The synchronizer sends all the actions concerning the remote database together with the associated record to the remote (step 616). The synchronizer then sends the unique ID of those records that require "acknowledgements" to be sent to the remote together with an appropriate flag (step 617).

Referring again to FIG. 5, for each action item or acknowledgement received at the remote segment (step 538), the following steps are performed. If the received data indicates an "acknowledgement" or "action" with respect to a record that was added or changed since the previous synchronization, the remote segment marks the new workspace entry that was created in either step 520 or step 525 as acknowledged (step 540). The remote segment also discards or removes any other entry in the workspace that contains the unique ID of this record, which is typically the entry that was loaded from the remote history file. Therefore, as previously described, this entry as opposed to the old remote history file entry associated with this record will be written into the history file at the end of the process at the remote segment. This in essence updates the history file, as will be described below.

If the received data indicates an action item that tells the remote segment to update, change, or add a remote database record (step 543), the remote segment performs that action with respect to the remote database. The remote segment also performs the same steps as steps 540 and 541 (step 544 and 545). If a new record was added to the database (step 546), it will be assigned a new unique ID. The remote segment sends that unique ID to the host segment (step 547). The host segment includes that unique ID in the host work space in association with that record (step 618 in FIG. 6).

After all the records have been received, the remote segment discards all unacknowledged entries from the workspace. Therefore, in the case of those added or changed records with which the user decided not to update the host database, the remote history file remains unchanged. The remote history file is then updated from the remote workspace. At this point the control module continues with step 410 in FIG. 4, i.e. creating the history file to end the synchronization of the two databases.

In the first embodiment, which we described above, the remote database assigns unique IDs to its records. We will now describe a second embodiment for the case where the remote database does not assign unique IDs to its records. In such a case, the remote segment provides some information less than all the fields of the records to uniquely identify an unchanged record to the host segment. This information may be a hash value. The host segment uses this information to find and then use the host history file copy of the unchanged remote database record to synchronize the two databases.

To identify a record from the previous synchronization or an unchanged record, the remote segment can use a content based code, that is a code whose value depends on the content of all or a selected number of the fields of a record. In the second embodiment, the remote segment uses hash numbers. Since in the case of an unchanged record, its content has remained the same, its hash number remains the same. The hash number acts as a unique identifier and therefore enables the remote and host segments to identify the unchanged record by its hash code. The hash code can be used to identify a record that is stored in the host history file, since its content remains the same from the end of one synchronization to the time it is updated. It may also be transmitted to identify an unchanged record or an unchanged version of a changed record. A host history file record can in effect be identified using the hash code of that record.

We will describe the operation of this embodiment in reference to FIGS. 7 and 8. Steps 701–711 are the same as steps 501–511 in FIG. 5, described above in reference to the first embodiment. These steps are generally concerned with finding the correct remote history file.

After determining that there is a suitable remote history file, for each record of the remote database (step 712), the following functions are performed. The remote segment loads and translates a record of the remote database into the remote workspace (step 713) and a hash number is calculated for that record (step 714). If the hash number of the remote record matches one or more hash numbers in the remote history file (step 715), then the remote segment assumes that the record has not been changed since a previous synchronization.

It is possible that the hash number may be repeated more than once, e.g. because of duplicate records or records that appear as duplicates because some of their fields are not synchronized. Therefore, the remote segment sends additional information that can be used to identify which of the multiple identical hash numbers a particular record relates to. This is done because during updating the remote history file record at the end of synchronization, the same number of identical hash numbers as matching remote database records are updated. In the second embodiment, this additional information is the index number associated with each entry of the remote workspace. Therefore, when the hash number of the remote record matches one or more hash numbers in the remote history file (step 715), the remote segment sends the hash number, a flag indicating that the record is unchanged, and the index number of that hash number to the host segment (step 716). Obviously if the index number was previously sent, the next index number for the identical hash is sent.

If the hash number does not match one or more hash numbers in the history file (step 717), the remote segment treats that record as having been newly added. Therefore, the remote segment sends the host segment a copy of the field values of the record, the remote workspace index number, and an "added" flag (step 720). The remote workspace index number makes it easier to perform future search of the remote workspace when data with respect to this record is received. As in the case of changed and added record in the first embodiment, the remote segment also creates a new remote workspace entry and enters hash number value of the record (step 718). The new entry is marked as "unacknowledged" (step 719). It should be noted that although the remote segment treats the record as a new record, the remote segment can not distinguish between an added and a changed record. Therefore, the synchronizer during synchronization does not treat it as a new record. Instead, the synchronizer compares the record to determine whether it matches with any of host history file record which would mean it is a changed record.

After reading all the remote database records and processing them (step 722), the remote segment removes from the remote workspace all entries that have hash numbers that are unmatched (step 723). These entries represent records that have either been changed or deleted since the previous synchronization.

After the remote segment has finished providing data to the host segment, the host segment synchronizes the two databases based on the input from the remote segment. The remote segment waits until the host segment finishes synchronizing and instructs the remote segment in step 409 in FIG. 4 to begin unloading into the remote database (step 724).

Referring to FIG. 8, as in the case of the first embodiment, the synchronizer on the host computer uses the information to identify those records in the host history file that correspond to the unchanged remote database records. For every record received from the remote segment that is flagged as added (step 801), the synchronizer adds the record to the host workspace (step 802) and during CAAR compares the record to the history file to determine whether the record is a changed or added record. For every record received from the remote segment that is flagged as "unchanged" (step 804), in the same manner as the first embodiment, the synchronizer finds the corresponding host history file record by finding a record that has the same hash number as that sent by the remote synchronizer (step 805). The synchronizer then clones the record (step 806), as previously described, and treats as if it is a record received from the remote database. At the end of this process, when all the records of the remote database are loaded into the host workspace, the control module proceeds to step 405 in FIG. 4 to begin CAAR. CAAR will then analyze the records in the host workspace to determine which remote records were added, which were changed, and which were deleted since the previous synchronization.

After CAAR, if the user confirms to proceed with updating the database, control module 2 instructs the synchronizer and the remote segment to proceed with unloading the records from the workspace into the remote database (step 409 in FIG. 4). As stated, at this point, the remote segment is waiting for the synchronizer to finish synchronizing (step 724 in FIG. 7). During performing CAAR, the synchronizer has determined what actions should be taken (update, delete, or add) to each database. If changes or additions are made to the host database in the case of a particular record but no action need be taken with respect to that record in the remote database, the synchronizer determines that at least an "acknowledgement" is to be sent to the remote segment. The synchronizer sends all the actions concerning the remote database together with the associated record and remote workspace index to the remote (step 809). The synchronizer then sends the remote workspace index of those records that require acknowledgements to be sent to the remote together with an appropriate flag (step 810). Therefore, the remote workspace index is used to identify which records in the remote workspace should be "acknowledged".

Referring back to FIG. 7, steps 725–729 are the same as steps 533–537, which were described in reference to the first embodiment. For each action item or acknowledgement received at the remote segment (step 730), the following steps are performed. If the data received indicates an "acknowledgement" or "action" with respect to a record that was sent to the host segment flagged as "added" (step 731), the remote segment marks the new workspace entry that was created in either step 718 as acknowledged (step 732). It should be noted that the remote workspace index number is used to locate the remote workspace entry. Therefore, as previously described, this entry will be written into the history file at the end of the process at the remote segment.

If the received data indicates an action item that tells the remote segment to update, change, or add a remote database record (step 733), the remote segment performs that action with respect to the remote database. The remote segment also updates the remote workspace and marks the entry as "acknowledge" (step 735).

After all the records have been received, the remote segment discards all unacknowledged entries from the workspace, which were newly created entries which were not acknowledged. Therefore, in case of those added or changed records with the user decided not to update the host database with, the remote history file remains unchanged. The remote history file is then updated from the workspace. At this point the control module continues with step 410 in FIG. 4, i.e. creating the history file to end the synchronization of the two databases.

Although we have described embodiments in which the host segment transforms the input from the remote segment, it should be noted that other embodiments of the host segment may not transform the input from the remote segment since they are designed to use inputs that informs them of which records have been changed, added and deleted or have been left unchanged. Other embodiments in which the host segment requires different types of input, the input from the remote segment are transformed as required. The various embodiments of the host segment may or may not use a history file.

Other embodiments are within the following claims.

What is claimed is:

1. A computer implemented method of identifying a record of a first database stored on a first computer to a second computer storing a second database, as part of a process of synchronizing the first and second databases, comprising:

reading a first record of the first database;

assigning a code to the first record of the first database, the code being based on at least a portion of the content of the first record of the first database, the code being insufficient to reconstruct the record but sufficient to identify the record;

transmitting the code to the second computer to identify the first record to the second computer; and using the code in the synchronization process to determine whether a record of the second database is identical to the first record.

2. The computer implemented method of claim 1 wherein the code comprises a hash number computed based on at least a portion of the content of the record of the first database.

3. A computer program, resident on a computer readable medium, for identifying a record of a first database stored on a first computer to a second computer storing a second database, as part of a process of synchronizing the first and second databases, comprising instructions for reading a first record of the first database;

assigning a code to the first record of the first database, the code being based on at least a portion of the content of the first record of the first database, the code being insufficient to reconstruct the record but sufficient to identify the record;

transmitting the code to the second computer to identify the first record to the second computer; and using the code in the synchronization process to determine whether a record of the second database is identical to the first record.

4. The computer program of claim 3 wherein the code comprises a hash number computed based on at least a portion of the content of the record of the first database.

* * * * *

UNITED STATES PATENT AND TRADEMARK OFFICE
CERTIFICATE OF CORRECTION

PATENT NO. : 6,223,187 B1
DATED : April 24, 2001
INVENTOR(S) : David J. Boothby and Robert C. Daley It is certified that error appears in the above-identified patent and that said Letters Patent is hereby corrected as shown below:

<u>Title page,</u>
Item [56], References Cited, OTHER PUBLICATIONS, the first "Chapura, Inc." reference, "http://www.champura.com/3compare.html" should be
-- http://www.chapura.com/3compare/html --.
U.S. Patent No. 5,251,151, "Demjaneko et al." should be -- Demjanenko et al. --.
U.S. Patent No. 5,745,712, "Tuprin et al." should be -- Turpin et al. --.

<u>Column 2,</u>
Line 3, "St. Jose" should be -- San Jose --.

<u>Column 3,</u>
Line 8, after "transmitted", delete the period.
Line 19, after "decreased", insert a period.
Line 23, after "in", delete "a".

<u>Column 4,</u>
Line 23, "computer" should be -- computers --.

<u>Column 6,</u>
Line 9, after "records", delete the period.
Line 55, "'Apr. 1, 1997'" should be -- "April 1, 97" --.
Line 57, "Apr. 1, 1997" should be -- "4-1-97". --.
Line 63, "St. Jose" should be -- San Jose --.

<u>Column 7,</u>
Line 50, after "records", delete the period.

<u>Column 9,</u>
Line 26, "examine" should be -- examines --.

<u>Column 10,</u>
Line 23, "use" should be -- used --.

<u>Column 11,</u>
Line 59, "IDS" should be -- IDs --.

UNITED STATES PATENT AND TRADEMARK OFFICE
CERTIFICATE OF CORRECTION

PATENT NO. : 6,223,187 B1
DATED : April 24, 2001
INVENTOR(S) : David J. Boothby and Robert C. Daley It is certified that error appears in the above-identified patent and that said Letters Patent is hereby corrected as shown below:

<u>Column 12,</u>
Line 1, "database" should be -- databases --.
Line 48, "contains" should be -- contain --.

<u>Column 15,</u>
Line 20, "can not" should be -- cannot --.

Signed and Sealed this

Third Day of December, 2002

JAMES E. ROGAN
*Director of the United States Patent and Trademark Office*